United States Patent [19]

Gessner et al.

[11] Patent Number: 5,504,032
[45] Date of Patent: Apr. 2, 1996

[54] MICROMECHANICAL ACCELEROMETER AND METHOD OF MANUFACTURE THEREOF

[75] Inventors: Thomas Gessner, Chemnitz; Martin Hafen, Rottweil; Eberhard Handrich, Kirchzarten; Peter Leinfelder, Ehrenkirchen; Bruno Ryrko, Denzlingen; Egbert Vetter, Gelenau; Maik Wiemer, Limbach-Oberfrohna, all of Germany

[73] Assignee: LITEF GmbH, Freiburg im Breisgau, Germany

[21] Appl. No.: 224,750

[22] Filed: Apr. 7, 1994

[30] Foreign Application Priority Data

May 5, 1993 [EP] European Pat. Off. .............. 93107287

[51] Int. Cl.⁶ .................................................. H01L 21/76
[52] U.S. Cl. ....................... 437/63; 437/7; 148/DIG. 12; 73/514.32; 73/514.35; 73/514.36
[58] Field of Search ................................. 437/63, 7, 228; 148/DIG. 12; 73/514.21, 514.32, 514.35, 514.36

[56] References Cited

U.S. PATENT DOCUMENTS

| | | | |
|---|---|---|---|
| 4,435,737 | 4/1984 | Colton | 361/280 |
| 4,694,687 | 9/1987 | Bonin et al. | 73/116 |
| 5,006,487 | 4/1991 | Stokes | 148/DIG. 12 |
| 5,095,401 | 3/1992 | Zavracky et al. | 361/283 |
| 5,095,752 | 3/1992 | Suzuki et al. | 73/517 R |
| 5,243,861 | 9/1993 | Kloeck et al. | 73/517 R |
| 5,352,918 | 10/1994 | Thomas et al. | 73/514.32 |

FOREIGN PATENT DOCUMENTS

| | | |
|---|---|---|
| 0369352 | 11/1989 | European Pat. Off. . |
| 3742385 | 6/1989 | Germany . |

OTHER PUBLICATIONS

European Search Report also enclosed.

Primary Examiner—Brian E. Hearn
Assistant Examiner—Trung Dang
Attorney, Agent, or Firm—Elliott N. Kramsky

[57] ABSTRACT

A high precision micromechanical accelerometer comprises a layered structure of five (5) semiconductor wafers insulated from one another by thin semiconductor material oxide layers. The accelerometer is formed by first connecting a coverplate and a baseplate to associated insulating plates. Counter-electrodes, produced by anisotropic etching from the respective insulating plates, are fixed to the coverplate and the baseplate respectively. The counter-electrodes are contactable through the cover or baseplate via contact windows. A central wafer contains a unilaterally linked mass (pendulum) that is also produced by anisotropic etching and which serves as a movable central electrode of a differential capacitor. The layered structure is hermetically sealed by semiconductor fusion bonding. A stepped gradation from the top is formed at a wafer edge region for attaching contact pads to individual wafers to permit electrical contacting of individual wafers. The invention permits fabrication of a μB device characterized by extremely small leakage capacitances and high temperature stability.

13 Claims, 3 Drawing Sheets

MICROMECHANICAL ACCELEROMETER AND METHOD OF MANUFACTURE THEREOF

BACKGROUND

1. Field of the Invention

The present invention relates to micromechanical accelerometers. More particularly, this invention pertains to a micromechanical accelerometer having a movable mass that forms the central plane of a differential capacitor and to a method of manufacture thereof.

2. Description of the Prior Art

Micromechanical acceleration sensors are increasingly employed in conjunction with capacitive measuring systems for high precision measurement of accelerations in the μg range. Such devices are capable of detecting the smallest displacements (i.e. very small acceleration forces). The associated capacitive measuring systems are currently capable of resolution in the femtofarad (fF) range.

Capacitive readouts are preferred in micromechanical sensors of the aforementioned type due to the circuit-board fabrication of acceleration sensors etched from wafers. The measurement of differential capacitance changes is employed, in most cases, to increase sensitivity. In that method, a central plate (central wafer) moves linearly or rotationally in relation to two outer plates (a top wafer and a base wafer) and the difference between the two resulting capacitances is read out. In order to increase the measurement range considerably, electrostatic restoring methods, known in micromechanics, which utilize the field forces between the capacitor plates, are employed for restoration of movement of the central plate (i.e., the deflected mass). In such case, the restoration occurs through regulation of field strength or through digital regulation of temporal duration (e.g. pulse width regulation), as a constant field strength is applied. In all systems of the above-mentioned type that employ a capacitive readout, the lowest possible leakage capacitance is desired.

Differential capacitors of the above-identified type are frequently formed in micromechanics by two metal electrodes applied to glass plates and to a silicon disc, secured by anodic bonding between the glass plates. The movable central electrode (i.e., the mass to be deflected in the manner of a pendulum by inertia forces) is etched into the silicon disc and is electrically connected to the silicon frame surrounding it. In such systems, however, leakage capacitances are of the same order of magnitude or even greater than the useful capacitances due to the relatively large surfaces of the silicon frame in comparison to the surrounding, current-carrying components. Further difficulties are due to the fact that, in spite of great efforts, it has not yet proved possible to develop a glass material whose coefficient of expansion is matched, over a wide temperature range, to that of the preferred monocrystalline wafer material, silicon, that can be fabricated and connected by bonding to the wafer material.

In order to reduce the difficulties arising from differing coefficients of expansion, the base wafer and the top wafer are frequently constructed from silicon wafers with thin glass coatings. It is, however, disadvantageous in any glass insulation for conductor tracks for the outer electrodes to be guided through the bond margins that must guarantee a hermetic seal of the interior from the environment. Solutions to this problem involve guiding the conductor tracks in channels that are subsequently sealed by injection of plastic material. Sealing cannot be guaranteed, however, with this type of supply line, especially over relatively long periods of time and in the presence of large temperature differences.

SUMMARY AND OBJECT OF THE INVENTION

It is therefore the object of the present invention to provide a high precision measuring device with capacitive readout for accelerations, which is hermetically sealed, and in which leakage capacitances are avoided to a large extent and mechanical stresses due to differing coefficients of thermal expansion do not occur.

The present invention addresses the preceding problems of the prior art and achieves the above object by providing, in a first aspect, a method for manufacturing a micromechanical accelerometer of the type that includes a movable mass that forms the central portion of a differential capacitor. The method is begun by preparing an upper and a lower coverplate by bonding an inner wafer forming an insulating plate to each of two unstructured wafers. Contact windows to counterelectrodes opposite the movable mass, extending through the coverplate and the baseplate to the insulating plates, are then generated by anisotropic etching after masking of the coverplate and the baseplate. The counterelectrodes are defined by anisotropic etching of the respective insulating plates.

A unilaterally linked plate-shaped mass that is perpendicularly movable with respect to a central semiconductor wafer plane is then formed by masking and then anisotropic etching of the wafer disposed between the coverplate and the baseplate containing insulating plates. The coverplate and the baseplate, with their associated insulating plates, are then connected in hermetically sealed fashion, with the central semiconductor wafer that contains the movable mass disposed therebetween, by semiconductor fushion bonding whereby the accelerometer is produced as a layered composite of a plurality of plate-like semiconductor wafers.

In order to obtain disturbance-free counterelectrode electrical contact, it is helpful to insulate the contact windows (produced by anisotropic etching) from the coverplate and from the baseplate by formation of a semiconductor material oxide layer.

It is further provided by the invention to form a stepped structure along an edge of the layered structure by anisotropic etching-away of individual wafer layers in the region of that edge to permit optimal electrical contacting of the individual (as a rule, five) semiconductor wafer layers of the layered structure. The selective application of a metallization via the respective step offsets or step plateaux for contacting the individual semiconductor layers provides layers for contacting with connecting wires by wire bonding. The edge-side etching-away of the individual wafer plates can take place at the same time as the etching of the respective wafer discs.

The prepared coverplate and baseplate layers (in each instance with associated frame-like insulating plate) and the central plate of the deflectable mass are preferably prepared under vacuum by semiconductor fusion bonding to the layered composite that is externally hermetically sealed.

The invention makes use of known teachings in micromechanics, including the concepts of using a single material for the counter-electrode carrying base and for the cover layers and for the central wafer layer. In this situation, a monocrystalline semiconductor material is of principal interest and for many purposes silicon, as the commonest semiconductor material, is preferred due to its good etching selectivity. In the invention, the insulation of individual layers from one another is accomplished by bondable layers, especially of silica. Silica has different thermal and mechanical properties from silicon, yet it has become evident to the inventors that the above described technological problems can be controlled by the application of very thin semiconductor material oxide layers.

In a second aspect, the invention provides a micromechanical accelerometer in which a movably suspended mass forms the central electrode of a differential capacitor. A coverplate includes an upper, frame-like insulating plate disposed therebelow and a baseplate having a frame-like insulating plate disposed thereabove. Each of the coverplate and the baseplate comprises a semiconductor wafer bonded to the associated insulating plate.

An interior counterelectrode is associated with each of the coverplate and the baseplate. Each counterelectrode is surrounded on all sides at the margin by the frame of the associated insulating plate acting as screening and is insulated from the associated coverplate and baseplate by a semiconductor material oxide layer lying therebetween. A frame-like central plate is disposed between the coverplate and the baseplate with associated frame-like insulating plates.

The central plate includes a plate-like mass for functioning as a pendulum articulated to a frame spar on one side and integrally connected to the frame. The plate-like mass is deflectable perpendicular to the plane of the plate. At the same time, it forms the movable central electrode of the differential capacitor in opposition to and alignment with the counterelectrodes whereby the accelerometer is characterized by a multilayer, plate-like layered structure of differently etched semiconductors insulated from one another by semiconductor material oxide layers and externally hermetically sealed by wafer bonding.

An advantageous arrangement for contacting the individual semiconductor wafer layers is obtained by etching away the wafers to create an offset (in the manner of steps) whereby the wafers are partially exposed along an edge. In this way, electrical contact may be provided at the respectively exposed step plateau by application of an appropriate metal pad with a bonded-on connecting wire. This type of contact is of particular advantage for incorporation of the micromechanical measuring device into standardized housings and/or standardized contact rasters of electrical printed circuit boards. Other arrangements of the steps are possible; for example, the connecting pads may be applied at the four corners of the accelerometer.

Accordingly, in the fabrication in accordance with the invention of the differential capacitor, the cover wafer and the base wafer are composed, in each instance, of two semiconductor (preferably silicon) discs, insulated from one another. The two insulated parts of the cover wafer and base wafer are geometrically designed so that, in each instance, a first partial region lies opposite the frame of the central electrode and a second partial region lies opposite the movable electrode as a capacitance plate (i.e., a counterelectrode). The base wafer and cover wafer are mechanically connected to the central wafer at the outer frame parts of the counterelectrodes and are electrically insulated.

The preceding and other features and advantages of the invention will become further apparent from the detailed description that follows. Such description is accompanied by a set of drawing figures. Numerals of the drawing figures correspond to those of the written description. Like numerals refer to like features throughout both the written description and the drawing figures.

DETAILED DESCRIPTION OF THE PREFERRED EMBODIMENT

Figure 1:
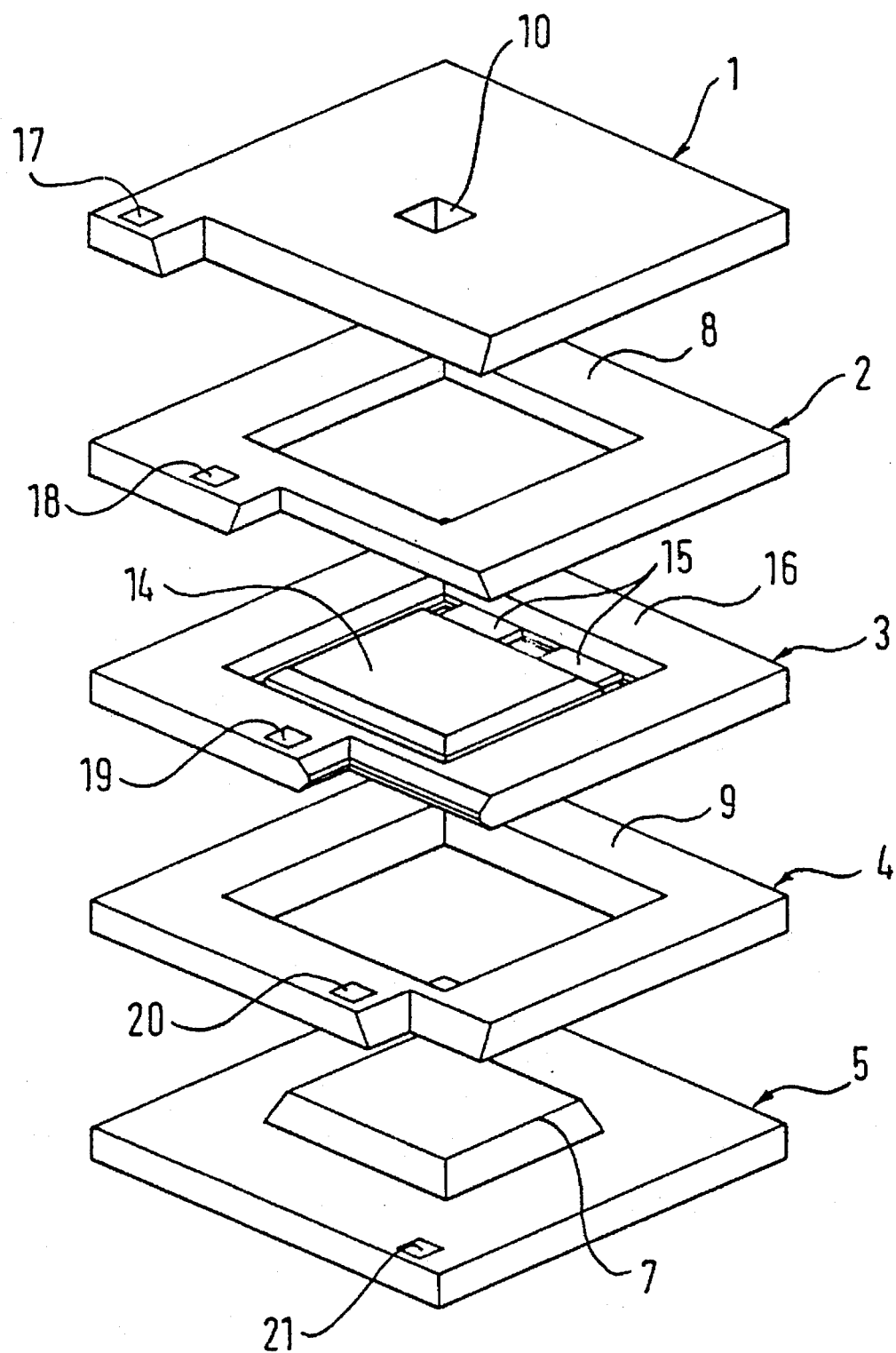
FIG. 1 is an exploded perspective view for illustrating the layered structure of a micromechanical accelerometer with capacitive readout in accordance with the invention.

FIG. 1 is an exploded perspective view of a micromechanical accelerometer with capacitive readout in accordance with the invention. The representation of FIG. 1 shows five semiconductor wafers disposed from top to bottom, one above the other. The wafers comprise a coverplate 1 with a first counterelectrode 6 (not shown in FIG. 1), an upper insulating plate 2 with frame 8 and a central plate 3, with a mass 14 in the free central region that is integrally connected to an associated central frame 16 by webs 15 and deflectible in the manner of a pendulum. The mass 14 also forms the movable electrode of the differential capacitor configuration (with approximately mirror image symmetry). A lower insulating plate 4 with a frame 9 and a baseplate 5 supports the second stationary counterelectrode 7 that projects into a free region within the frame 9 of the lower insulating plate 4. The coverplate 1 and the baseplate 4 are provided with contact windows 10 and 11 respectively in the regions of the upper (first) stationary counterelectrode 6 and the lower (second) stationary counterelectrode 7. The windows 10, 11 are produced by anisotropic etching and are insulated from the coverplate 1 and from the baseplate 45 respectively by thin layers 12 and 13 of semiconductor oxide. The semiconductor material oxide layers 12, 13 are etched through in the trench floors of the contact windows 10, 11 up to the respective counterelectrodes 6 and 7. These exposed positions are then contact positions that are subsequently metallized with the metal layer covering the oxide layer at the margins 22 and 23 respectively. Contacting of the stationary counterelectrodes 6 and 7 can also be accomplished by a metallization penetrating the oxide layers 12 and 13 respectively with contact wires (not shown) bonded thereon; in that case, it is helpful to provide baseplate and coverplate wafers of low conductivity to additionally increase the electrical time constant of the leakage capacitance.

Figure 2:
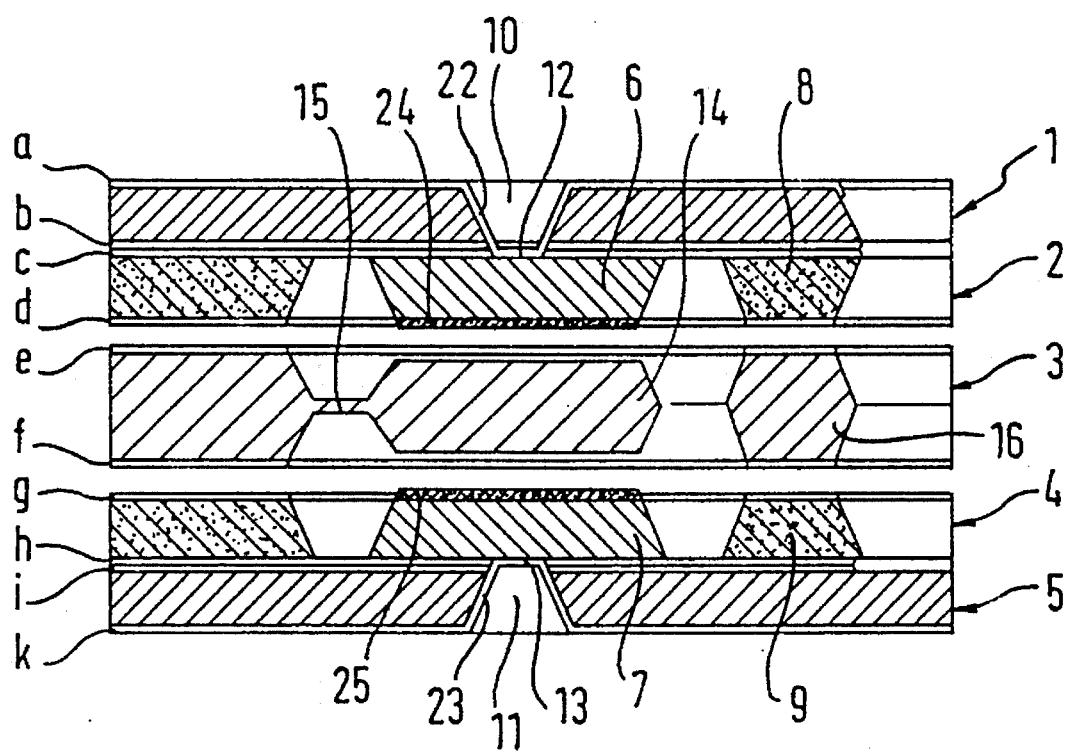
FIG. 2 is a partial cross-sectional view illustrating an essential portion of a micromechanical accelerometer fabricated in accordance with the invention.

As a result of their frame-like structures (i.e. the frames 8 and 9), which are directly contactable from outside, the insulating plates 2 and 4 form screenings for the counterelectrodes 6 and 7 respectively. The movable central electrode (i.e. the mass 14) is, in turn screened by the surrounding frame 16. As is evident from FIG. 2, the individual, plate-shaped semiconductor layers are insulated from one another by semiconductor material oxide layers a through k that lie therebetween. The surfaces of the counterelectrodes 6 and 7, each of which faces the central semiconductor wafer layer 3, are coated with silica or silicon nitride in a masking step.

In order to produce a first composite part from the coverplate 1 and the insulating plate 2, and a second composite part from the baseplate 5 and the lower insulating plate 4, two unstructured wafer discs, oxidized on all sides (or on only one), are, in each instance, bonded to one another. After appropriate masking, the coverplate 1 is then formed with the upper counterelectrode 6 etched out of the material of the insulating plate 2 and the baseplate 5 is formed with the lower counterelectrode 7 by means of anisotropic etching processes. The contact windows 10 and 11 to the counterelectrodes 6 and 7 are also produced in the course of etching. The central part 3 (i.e. the central frame 16 carrying the movable mass 14), is likewise formed by masking and anisotropic etching processes so that the mass 14, which acts as a pendulum, remains connected, via two or more resilient connecting webs 15, to the frame 16, while possessing a predetermined degree of freedom.

As may be seen in FIG. 1, each of the wafer plates 1 through 5 includes a projection on the same side. The projection is of shortest length at the coverplate 1, extending, in the case of the baseplate 5, the entire wafer width. With the mutually superposed arrangement, there is thus produced a stepped structure, with individual step plateaux being thereby provided for contacts by application of metallizations as contact pads 17 to 21. In a further process step, contact wires are fitted to the pads by bonding.

The contact pad 19 on the frame is for connection of the pendulum of the mass 14. Subsequently, the upper part comprising the coverplate 1 and the insulating plate 2, as well as the lower part comprising the baseplate 5 and the insulating plate 4, are connected to the ready-formed central part 3 by semiconductor fusion bonding (in the presence of a vacuum) and hermetically sealed. Semiconductor fusion bonding can also occur at atmospheric or excess pressure (i.e. with additional gas, especially a protective gas.) The constructional design of a micromechanical accelerometer in accordance with the invention thus permits contacting of all electrodes and insulating layers from the top by wire bonding.

A completed micromechanical accelerometer according to the invention will, as a rule, operate within a closed loop; in such case, the movable mass 14 is fettered (i.e. in each instance restored) by means of the electronic control system through the use of electrostatic forces.

Figure 3:
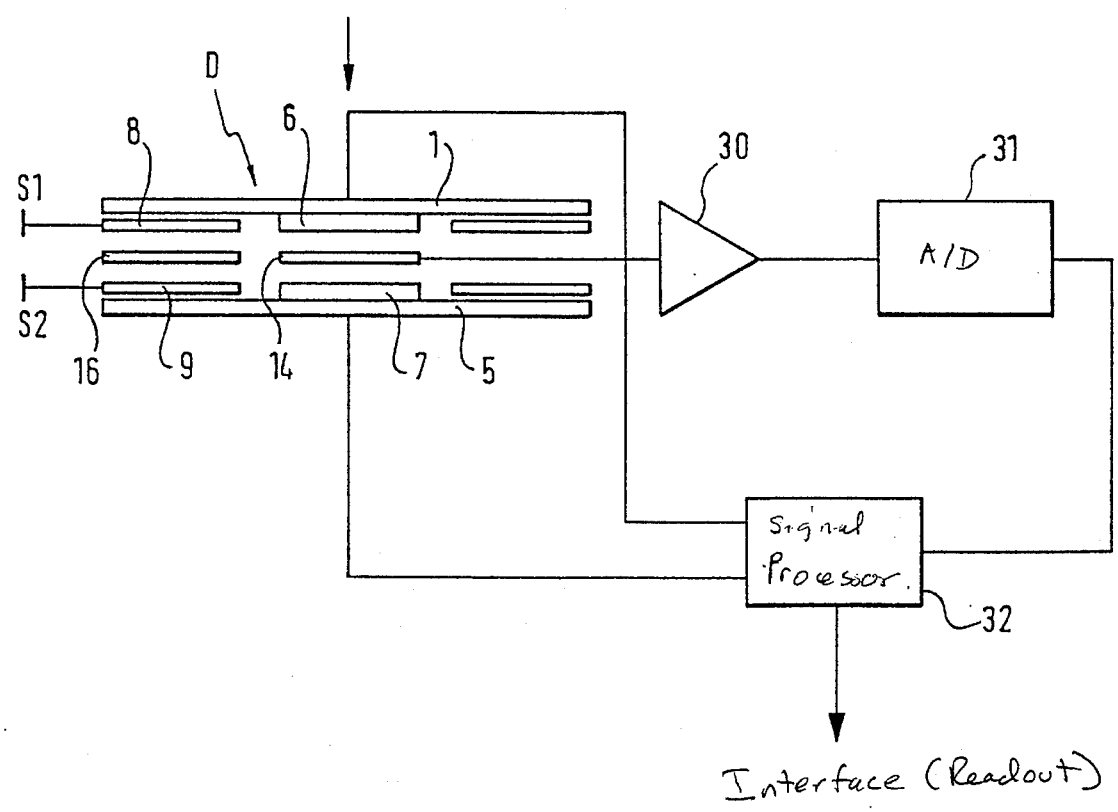
FIG. 3 is a block diagram of an accelerometer in accordance with the invention employed within a closed-loop measurement circuit.

FIG. 3 is a block diagram of an accelerometer in accordance with the invention employed within a closed-loop measurement circuit. The accelerometer is designated as differential capacitor D of the type according to the invention within the closed loop.

An acceleration along an input axis illustrated by an arrow causes deflection of the pendulum (i.e. the movable mass 14) which is picked up by the differential capacitor D. The signal of the pick-off is fed via a preamplifier 30 and an A/D converter 31 to a signal processor 32. The signal processor 32 computes the optical switching time for a pulse-width-modulated signal that is fed, via driver stages (not shown), to the differential capacitor D as an electrostatic actuating element. The signals are determined by the signal processor 32 in such a way that pendulum restoration is kept at an optimum under static and dynamic operational conditions.

An accelerometer in accordance with the invention, possessing capacitive readout, offers the following advantages in comparison to like known systems:

With appropriate circuitry, effective leakage capacitances can be kept extremely low due to the arrangement of the screening on all sides;

The coefficients of thermal expansion are equalized as all components are produced from the same material;

A high degree of strength of the layered structure and sealing of the measuring device is achieved by semiconductor fusion bonding, especially silicon fusion bonding, over the semiconductor oxide layers;

The supply lines to the outer electrodes, the screenings and the central electrode are provided by the inherent conductivity of the material or by self-adjusting, high-melting-point metals or silicides;

It is advantageous to provide the cover and base wafers with low conductivity to increase the electrical time constant of the leakage capacitance. The supply lines to the electrode can be made to have low resistance values through the use of metal coatings;

The layered structure can be produced as a whole in a relatively simple manner by means of anisotropic etching processes;

Metallizations for all of the individual levels can be applied simultaneously in a relatively simple manner by deposition of metal from contact pads onto the plateaux of stepwise offset contact regions.

Thus it is seen that the present invention provides a high precision measuring device with capacitive readout for accelerations that is hermetically sealed and in which leakage capacitances are avoided to a large extent and mechanical stresses due to differing coefficients of thermal expansion do not occur.

While this invention has been described with reference to its presently-preferred embodiment, it is not limited thereto. Rather, the invention is only limited insofar as it is defined by the following set of patent claims and includes all equivalents within its scope.

What is claimed is:

1. A method for manufacturing a micromechanical accelerometer of the type that includes a movable mass that forms the central electrode of a differential capacitor, said method comprising the steps of:

a) preparing an upper coverplate and a lower baseplate by bonding an inner wafer forming an insulating plate to each of two unstructured wafers; then b) generating contact windows, to counterelectrodes opposite said movable mass, that extend through said coverplate and said baseplate to said insulating plates by anisotropic etching after masking of said coverplate and said baseplate; and c) defining said counterelectrodes by anisotropic etching of said insulating plates; and d) forming a unilaterally linked plate-shaped mass which is perpendicularly movable with respect to a central semiconductor wafer plane by masking and anisotropic etching of said central semiconductor wafer disposed between said coverplate and said baseplate including said insulating plates; and then e) connecting said coverplate and said baseplate, with associated insulating plates, with said central semiconductor wafer, including said movable mass, disposed therebetween in hermetically sealed fashion by semiconductor fusion bonding whereby said accelerometer is produced as a layered composite of a plurality of individual plate-like semiconductor wafers.

2. A method as defined in claim 1 further including the step of forming a semiconductor material oxide layer for electrically insulating said contact windows through said coverplate and baseplate to said counterelectrodes from said coverplate and said baseplate.

3. A method as defined in claim 1 further including the step of coating the surfaces of said counterelectrodes that face said central semiconductor wafer with silica in a masking step.

4. A method as defined in claim 1 further including the step of coating the surfaces of said counterelectrodes that face said central semiconductor wafer with silicon nitride in a masking step.

5. A method as defined in claim 1 further including the steps of:
   a) forming a stepped structure comprising step offsets by anisotropic etching of said individual semiconductor wafers along one edge of said layered composite; then
   b) selectively applying metallizations to said step offsets; and then
   c) bonding conductor wires to said metallizations for contacting of said individual semiconductor wafers.

6. A method as defined in claim 5 wherein the step of etching of said individual wafers to form said edge-side stepping is performed at the same time as said other wafer etching steps.

7. A method as defined in claim 1 further characterized in that said individual semiconductor wafers are hermetically connected to form said layered composite by semiconductor fusion bonding under vacuum.

8. A method as defined in claim 1 further characterized in that said individual semiconductor wafers are hermetically connected to form said layered composite by semiconductor fusion bonding under ambient pressure in air.

9. A method as defined in claim 1 further characterized in that said individual semiconductor wafers are hermetically connected to form said layered composite by semiconductor fusion bonding under pressure.

10. A method as defined in claim 9 wherein said pressure comprises protective-gas excess pressure.

11. A method as defined in claim 1 further characterized in that said semiconductor wafers comprise monocrystalline semiconductor material.

12. A method as defined in claim 11 further characterized in that said semiconductor wafers comprise monocrystalline silicon.

13. A method as defined in claim 1 wherein said coverplate and said baseplate are produced from a wafer of low conductivity material.

* * * * *